United States Patent
Rajadurai et al.

(10) Patent No.: US 10,154,152 B2
(45) Date of Patent: Dec. 11, 2018

(54) METHOD AND SYSTEM FOR CHARGING INFORMATION RECORDING IN DEVICE TO DEVICE (D2D) COMMUNICATION

(71) Applicant: Samsung Electronics Co., Ltd, Gyeonggi-do (KR)

(72) Inventors: Rajavelsamy Rajadurai, Bangalore (IN); Erik Guttman, Waibstadt (DE)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/033,602

(22) PCT Filed: Oct. 31, 2014

(86) PCT No.: PCT/KR2014/010332
§ 371 (c)(1),
(2) Date: Apr. 29, 2016

(87) PCT Pub. No.: WO2015/065079
PCT Pub. Date: May 7, 2015

(65) Prior Publication Data
US 2016/0261757 A1    Sep. 8, 2016

(30) Foreign Application Priority Data

Oct. 31, 2013  (IN) .......................... 4914/CHE/2013
Oct. 23, 2014  (IN) .......................... 4914/CHE/2013

(51) Int. Cl.
*H04M 15/00* (2006.01)
*H04W 4/24* (2018.01)
(Continued)

(52) U.S. Cl.
CPC .... *H04M 15/8214* (2013.01); *H04L 12/1403* (2013.01); *H04L 63/00* (2013.01);
(Continued)

(58) Field of Classification Search
CPC .. H04M 15/8214; H04M 15/00; H04M 15/61; H04M 15/8228; H04M 15/85;
(Continued)

(56) References Cited

U.S. PATENT DOCUMENTS

| | | | | |
|---|---|---|---|---|
| 6,041,226 A | * | 3/2000 | Skoro, III | ............. H04M 15/00 |
| | | | | 455/405 |
| 2010/0057485 A1 | * | 3/2010 | Luft | ........................ H04W 4/00 |
| | | | | 455/411 |

(Continued)

FOREIGN PATENT DOCUMENTS

| | | |
|---|---|---|
| EP | 2645760 A1 | 10/2013 |
| JP | 2006-333449 | 12/2006 |

(Continued)

OTHER PUBLICATIONS

International Search Report dated Jan. 30, 2015 in connection with International Patent Application No. PCT/KR2014/010332, 3 pages.

(Continued)

*Primary Examiner* — Mong-Thuy T Tran

(57) ABSTRACT

Embodiments herein provide a method and system of reporting a charging information for a Device-to-Device (D2D) communication established using a wireless network. The method includes recording by a first electronic device the charging information associated with a D2D communication session. The D2D communication session is established between the first electronic device and a second electronic device. Further, the method includes determining by the first electronic device whether the charging information meets charging criteria during the D2D communication session. The charging criteria are generated by a network node in a secure environment of the first electronic device. Further, the method includes reporting the charging information to the network node in the wireless network in response to deter- (Continued)

mining that the charging information meets the charging criteria.

16 Claims, 13 Drawing Sheets

(51) Int. Cl.
    *H04L 12/14* (2006.01)
    *H04L 29/06* (2006.01)
    *H04W 12/04* (2009.01)
    *H04W 76/14* (2018.01)

(52) U.S. Cl.
    CPC .......... *H04M 15/00* (2013.01); *H04M 15/61* (2013.01); *H04M 15/8228* (2013.01); *H04M 15/85* (2013.01); *H04W 4/24* (2013.01); *H04W 12/04* (2013.01); *H04W 76/14* (2018.02); *H04L 12/1435* (2013.01); *H04L 12/1439* (2013.01)

(58) Field of Classification Search
    CPC ............. H04L 12/1403; H04L 12/1435; H04L 12/1439; H04L 63/00; H04W 24/24; H04W 12/04; H04W 76/023; H04W 76/14
    USPC .......................................... 455/407, 405, 406
    See application file for complete search history.

(56) References Cited

U.S. PATENT DOCUMENTS

| | | | | |
|---|---|---|---|---|
| 2010/0279647 A1* | 11/2010 | Jacobs | .................... | H04W 4/22 455/404.1 |
| 2011/0258327 A1* | 10/2011 | Phan | ..................... | H04W 16/10 709/227 |
| 2013/0102309 A1* | 4/2013 | Chande | ............... | H04W 52/244 455/435.1 |
| 2013/0258996 A1* | 10/2013 | Jung | ................. | H04W 72/1284 370/330 |
| 2013/0288668 A1* | 10/2013 | Pragada | ................ | H04W 12/06 455/426.1 |
| 2013/0324114 A1* | 12/2013 | Raghothaman | ..... | H04W 76/023 455/426.1 |
| 2014/0220951 A1* | 8/2014 | Gumbrell | .............. | H04W 4/005 455/418 |
| 2014/0243038 A1* | 8/2014 | Schmidt | .................. | H04W 4/90 455/552.1 |
| 2014/0273933 A1 | 9/2014 | Sharma et al. | | |
| 2014/0295832 A1* | 10/2014 | Ryu | ...................... | H04W 48/16 455/434 |
| 2014/0329494 A1* | 11/2014 | Zisimopoulos | ....... | H04M 15/66 455/406 |
| 2014/0342747 A1 | 11/2014 | Lee et al. | | |
| 2015/0004984 A1 | 1/2015 | Kim et al. | | |
| 2015/0031405 A1* | 1/2015 | Ofir | ........................ | H04W 4/08 455/509 |
| 2015/0043429 A1 | 2/2015 | Kim et al. | | |
| 2016/0150391 A1* | 5/2016 | Lee | ..................... | H04W 56/002 370/329 |
| 2016/0242152 A1* | 8/2016 | Yu | ......................... | H04W 8/005 |
| 2016/0278115 A1* | 9/2016 | Shrader | ................. | H04W 76/14 |

FOREIGN PATENT DOCUMENTS

| | | |
|---|---|---|
| WO | WO 2013/109040 A1 | 7/2013 |
| WO | WO 2013/109100 A1 | 7/2013 |
| WO | WO 2013/122374 A1 | 8/2013 |

OTHER PUBLICATIONS

Written Opinion of International Searching Authority dated Jan. 30, 2015 in connection with International Patent Application No. PCT/KR2014/010332, 5 pages.

3GPP, "3rd Generation Partnership Project; Technical Specification Group Services and System Aspects; Service Aspects; Charging and Billing", Release 12, 3GPP TS 22.115 V.12.2.0, Sep. 2013, 29 pages.

Extended European Search Report for European Application No. 14858695.1, dated Aug. 4, 2017. (11 pages).

* cited by examiner

METHOD AND SYSTEM FOR CHARGING INFORMATION RECORDING IN DEVICE TO DEVICE (D2D) COMMUNICATION

CROSS-REFERENCE TO RELATED APPLICATION(S)

The present application claims priority under 35 U.S.C. § 365 to International Patent Application No. PCT/KR2014/010332 filed Oct. 31, 2014, entitled "METHOD AND SYSTEM FOR CHARGING INFORMATION RECORDING IN DEVICE TO DEVICE (D2D) COMMUNICATION", and, through International Patent Application No. PCT/KR2014/010332, to Indian Patent Application No. 4914/CHE/2013 filed Oct. 31, 2013, and Indian Patent Application No. 4914/CHE/2013 filed Oct. 23, 2014, each of which are incorporated herein by reference into the present disclosure as if fully set forth herein.

TECHNICAL FIELD

The present invention generally relates to wireless communication networks and more particularly to a charging mechanism in a Device-to-Device (D2D) communication. The present application is based on, and claims priority from an Indian Application Number 4914/CHE/2013 filed on 31 Oct. 2013, the disclosure of which is hereby incorporated by reference herein.

BACKGROUND ART

D2D communication or Proximity based service (Prose) communication refers to a communication mode between a pair of electronic devices. The D2D communication enables an electronic device to directly communicate and exchange data with a neighboring electronic device without the help of a cellular network, and each electronic device for the D2D communication broadcasts the electronic devices own information in order to inform other electronic devices of information on itself.

The above information is presented as background information only to help the reader to understand the present invention. Applicants have made no determination and make no assertion as to whether any of the above might be applicable as Prior Art with regard to the present application.

DISCLOSURE OF INVENTION

Technical Problem the wireless network (hereinafter referred as "network node") will assign a radio spectrum to the electronic device to initiate a D2D communication session with other electronic device. When using a radio access technology used in the wireless network, the use of the frequency band in which wireless service is certified by the operator can output a higher radio transmission power. Since the electronic device use the radio spectrum assigned by the network node, the electronic device will be charged by the operator for the usage of radio spectrum in the D2D communication session.

Existing methods explains reporting charging information by first electronic device to the network node when the first electronic device is in connection with a second electronic device for the Proximity based Service (ProSe) communication. In this scenario, the first electronic device will report the charging information to the network node when the connection with the second electronic device is released.

Solution to Problem

Embodiments herein provide a method of recording and reporting charging information for a Device-to-Device (D2D) communication established using a wireless network. The method includes recording by a first electronic device the charging information associated with a D2D communication session in a secure environment. The D2D communication session is between the first electronic device and a second electronic device. Further, the method includes determining by the first electronic device whether the recorded charging information meets charging criteria during the D2D communication session. The storage of the number of keys or data or time usage information or the execution of the reporting procedure to the network is done in the secure environment in the electronic device that is trusted by the network or an operator. The charging criteria are configured by a network node in a secure environment of the first electronic device. Further, the method includes reporting the recorded charging information to the network node in the wireless network in response to determining that the recorded charging information meets the charging criteria.

Embodiments herein provide a system of reporting a charging information for a Device-to-Device (D2D) communication established using a wireless network. The system includes a recording module configured to record the charging information associated with a D2D communication session in a secure environment. The D2D communication session is between a first electronic device and a second electronic device. Further, the system includes a controller module configured to determine whether the charging information meets charging criteria during the D2D communication session. The charging criteria are generated by a network node in a secure environment of the first electronic device. Further, the system includes a reporting module configured to report the recorded charging information to the network node in the wireless network in response to determining that the charging information meets the charging criteria.

Embodiments herein provide a computer program product comprising computer executable program code recorded on a computer readable non-transitory storage medium. The computer executable program code when executed causing the actions including recording by a first electronic device the charging information associated with a D2D communication session in a secure environment. The D2D communication session is between the first electronic device and a second electronic device. Further, the computer executable program code when executed causing the actions including determining by the first electronic device whether the charging information meets a charging criteria during the D2D communication session. The charging criteria are generated by a network node in a secure environment of the first electronic device. Further, the computer executable program code when executed causing the actions including reporting the recorded charging information to the network node in the wireless network in response to determining that the charging information meets the charging criteria.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

In an exemplary feature of the present invention, a electronic device may record and report charging information for a Device-to-Device (D2D) communication established using a wireless network.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

MODE FOR THE INVENTION

Figure 1A:
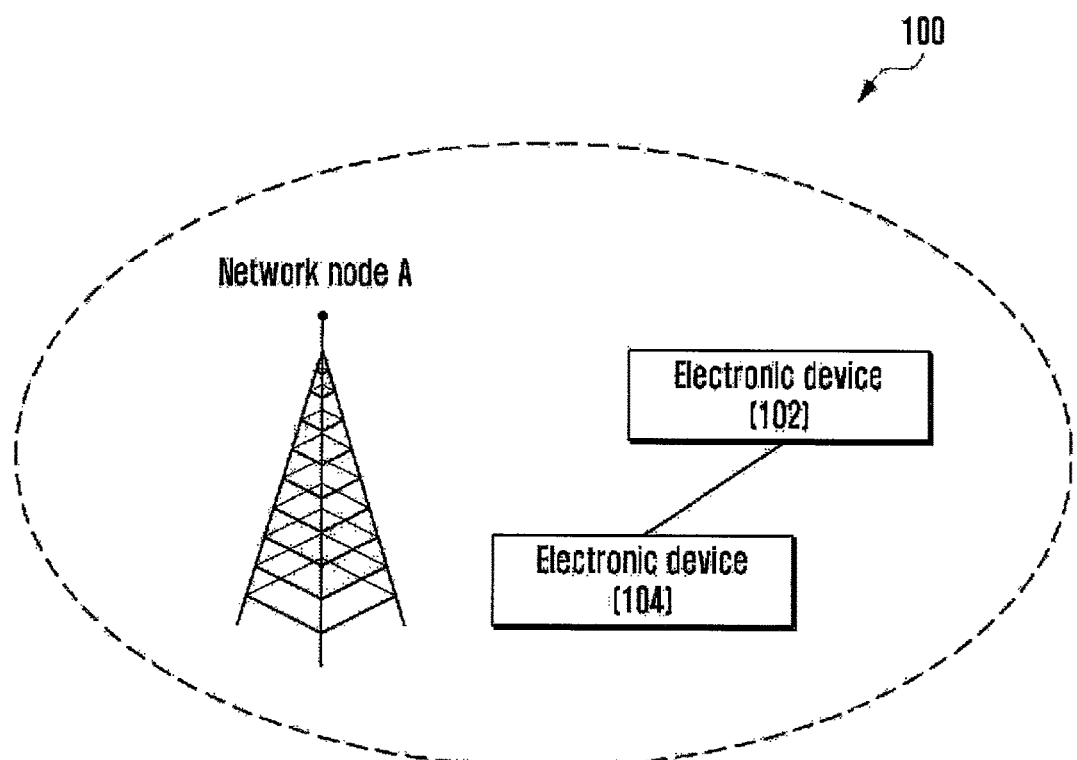
FIGS. 1a-1b illustrate an overview of a system for reporting a charging information for a Device-to-Device (D2D) communication established using a wireless network, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The words "Proximity service (ProSe) communication", "Device-to-Device (D2D) communication", "Peer-to-Peer communication (P2P)", "Direct communication" are used interchangeably throughout the draft.

The words "Proximity service (Prose) communication session", "Device-to-Device (D2D) communication session", "Peer-to-Peer (P2P) communication session", and "Direct communication session" are used interchangeably throughout the draft.

The words "First electronic device", "User Equipment (UE)" and "Electronic device 102" are used interchangeably throughout the draft.

The words "Second electronic device" and "Electronic device 104" are used interchangeably throughout the draft and can be more than one device.

The words "UICC", "trust environment" "UICC module 202" and "Secure environment" are used interchangeably throughout the draft. Further, the secure environment is the trusted portion or entity in the electronic device by the mobile operator's charging system or mobile network or any third party network. The secure environment in the electronic device can be for example but not limited to or combination of a UICC, secure element, SD card, secure part of the application processor, secure part of the mobile operating system, mobile platform security.

The words "duration of time" and "duration of communication" are used interchangeably throughout the draft.

The words "session key" and "traffic key" are used interchangeably throughout the draft.

The embodiments herein disclose a method and system of recording and reporting charging information for a Device-to-Device (D2D) communication established using a wireless network. A first electronic device receives charging criteria from a network node. On receiving a charging criteria (i.e., a secure parameter), the first electronic device initiates the D2D communication session with a second electronic device, by deriving charging metric. In an embodiment, the charging criteria includes the charging metric which corresponds to a predefined amount of time the first electronic device secures the communication using the charging metric with the second electronic device during the D2D communication session. In another embodiment, the charging criteria include a charging metric which corresponds to a predefined amount of data to be transferred between the first electronic device and the second electronic device during the D2D communication session. In an example, the data is a Packet Data Convergence Protocol (PDCP) packet data unit. The charging criteria including the charging metric can be dynamically generated or derived in a secure environment of the first electronic device. In an embodiment, the secure environment is a Universal Integrated Circuit Card (UICC) module of the first electronic device, trust environment in the electronic device, KNOX, ARM trust zone or the like.

In another embodiment, the charging criteria includes a charging metric corresponds to a predefined number of keys (i.e., charging metric) to be used to secure communication between the first electronic device and the second electronic device during the D2D communication session. The charging metric is dynamically generated in the secure environment by the network node or derived in the secure environment. In another embodiment, the charging criteria include but not limited to a reporting time, when requested by the network, whenever UE comes back to the network coverage.

In an embodiment, the charging information includes a number of keys issued to the secure communication between the first electronic device and the second electronic device during the D2D communication session along with other parameters such as but not limited to, identities of the keys, identity of the UEs, and data volume transmitted or received.

In an embodiment, the first electronic device sends a D2D communication service request to the second electronic device. On accepting the D2D communication service request by the second electronic device, the D2D communication session is established between the first electronic device and the second electronic device. During the D2D communication session, the first electronic device receives data from the second electronic device. Further, during the D2D communication session, the first electronic device transmits data to the second electronic device. The first electronic device records charging information associated with the D2D communication session may be for both transmission and reception. In an embodiment, the charging information includes duration of time that the first electronic device communicates with the second electronic device during the D2D communication session. In another embodiment, the charging information includes the amount of data transferred between the first electronic device and the second electronic device during the D2D communication session. Further, in another embodiment, the charging information includes the number of security keys (i.e., charging metric) used between the first electronic device and the second electronic device during the D2D communication session.

The first electronic device determines whether the charging information meets the charging criteria during the D2D communication session to control the charging aspects. In an embodiment, counting duration of time that the first electronic device communicates with the second electronic device meets the predefined amount of time during the D2D communication session. The duration of time is dynamically recorded in the charging record. The first electronic device determines whether the duration of time meets the charging metric to trigger reporting of the charging information to the network node in the wireless network and may also stop further direct communication, if further new charging metric is not received from the network. In another embodiment, counting the amount of data transferred between the first electronic device and the second electronic device during the D2D communication session. The amount of counted data is dynamically recorded in the charging information. Further, the first electronic device determines whether the amount of data meets the charging metric to trigger reporting of the charging information to the network node in the wireless network and may also stop further direct communication, if further new charging metric is not received from the network. In another embodiment, counting the number of keys issued to the mobile device for securing the communication between the first electronic device and the second electronic device during the D2D communication session. The number of keys derived and issued is dynamically recorded in the charging information. Further, the first electronic device determines whether the number of keys issued meets the charging metric to trigger reporting of the charging information to the network node in the wireless network and may also stop further direct communication, if further new charging metric is not received from the network. When the first electronic device determines that the charging information meets the charging criteria, then it reports the charging information to the network node or whenever requested by the network or based on the configured reporting time. Further, the first electronic device generates a new charging metric during the D2D communication session after it determines that the charging information meets the charging criteria. The first electronic device checks whether the charging metric which is configured initially is less than the permitted charging metric and decides on the next charging metric value. The first electronic device derives new charging criteria and provides the new charging criteria along with the charging metric. Then the first electronic device initiates the charging metric refreshing process to resume the D2D communication session with the second electronic device in the wireless network.

Once the lifetime of the charging metric is expired, the first electronic device can delete the configuration data. In an embodiment, the first electronic device can store the configuration data for the network node to assess after determining the lifetime of the charging metric is expired. Based on the authorized subscription and credits/credentials available for the first electronic device, the network node renews the configuration data. Before the lifetime expires, either the network provides configuration along with new lifetime or alternatively, the device (UICC) contacts the network to obtain lifetime extensions. The configuration data is securely stored in first electronic device and security mechanisms can be applied at an Access Stratum (AS) layer (L1-L3 layer of a mobile terminal) or at a Non-access stratum (NAS) layer.

For example, consider a scenario where the first electronic device receives a predefined time limit of 2 minutes. The first electronic device communicates with the second electronic device during the D2D communication session. On receiving the predefined time limit of 2 minutes the first electronic device initiates the D2D communication session with the second electronic device. The first electronic device records the duration of time in which the first electronic device communicates with the second electronic device. The first electronic device determines whether the duration of time meets with the predefined time duration of 2 minutes. The first electronic device reports the duration of time on determining that the duration of time meets with the predefined time duration of 2 minutes. Further, the first electronic device may receive a predefined time limit of 2 minutes more to communicate with the second electronic device.

In another example, consider a scenario where the first electronic device receives a predefined amount of data limit of 10 MB to be transferred between the first electronic device and the second electronic device during the D2D communication session. On receiving the predefined amount data limit of 10 MB, the first electronic device initiates the D2D communication session with the second electronic device. The first electronic device records the amount of data in which the first electronic device communicates with the second electronic device in the secure environment. The first electronic device determines whether the amount of data meets with the predefined amount of data limit of 10 MB. The first electronic device reports the amount of data on determining that the amount of data transferred meets with the predefined amount of data of 10 MB. The report may be sent by the secure environment securely to the network directly. Further, the first electronic device may receive authorization for another data limit of 10 MB more to communicate with the second electronic device (based on the subscription).

Further in another example, consider a scenario of usage reporting where the first electronic device initiates the D2D communication session with the second electronic device. The first electronic device records the amount of data in which the first electronic device communicates with the second electronic device in the secure environment. The first electronic device reports the recorded amount of data to the network. The report may be sent by the secure environment securely to the network directly periodically, based on the configured reporting period.

In an embodiment, if the electronic device is out of coverage of the network, the electronic device creates the corresponding usage information report and stores the usage information in the secure environment. When the electronic device enters into the network coverage, then it sends the stored usage information report to the network.

Although the above mentioned description is written with respect to first electronic device, it is to be understood to a person of ordinary skill in the art that the second electronic device and also more than two electronic devices (for a group communication or broadcast communication) can also perform same functions of the first electronic device (records and sends the respective usage information reports about the direct communication to the network). The usage information being the data transmitted and may also include the received data details.

In conventional systems, the first electronic device reports the charging information to the network node when the first electronic device is in D2D communication with the second electronic device. The first electronic device will report the charging information once the connection between the first electronic device and the second electronic device is released or based on the configured report time.

Unlike conventional systems, number of keys or time or volume of data communication between the first electronic device and the second electronic device in the D2D communication session is used as the charging metric in which the operators intends to charge the first electronic device. The operators can impose credit or debit limits for direct communication between the devices; thereby, preventing "law abiding electronic devices" with non-hacked hardware from exceeding their contract or prepaid values. Also, the electronic devices can impose credit or debit limits during the direct communication without using the communication line of the core network and radio access network carrier. Further, the proposed method does not use various devices such as a switch or a radio base station. Therefore, it is possible to build and maintain a network cheaper than the capital investment and maintenance costs for the network. The network can withstand high traffic of conventional telecommunications carriers that provide direct communication, communication billing system of direct communication. It is also possible to introduce a flexible billing system, such as the less expensive than the normal communication using the operator's network.

Referring now to the drawings, and more particularly to FIGS. 1 through 11, where similar reference characters denote corresponding features consistently throughout the figures, there are shown preferred embodiments.

Figure 1B:
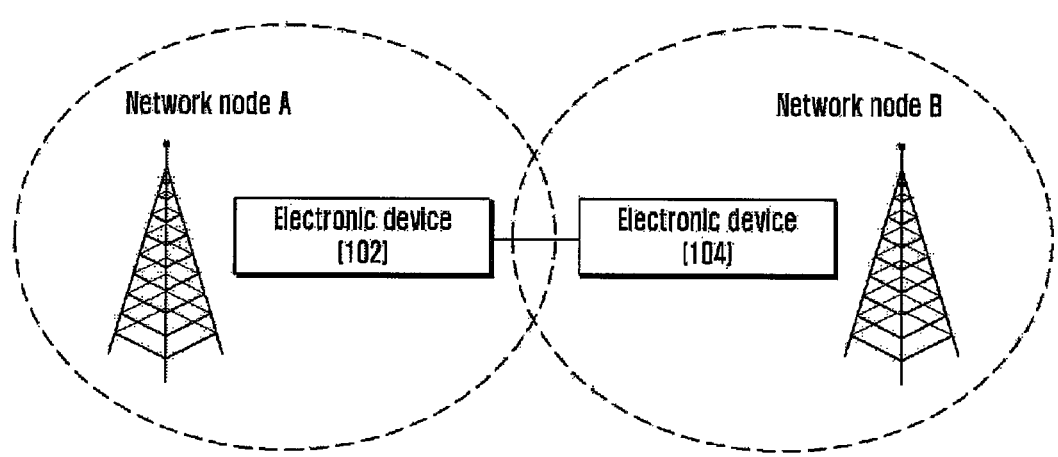

FIGS. 1a-1b illustrate an overview of a system 100 for reporting a charging information for a Device-to-Device (D2D) communication established using a wireless network, according to embodiments as disclosed herein. The system 100 includes an electronic device 102, an electronic device 104, a Network node A, and a Network node B. In an embodiment, the electronic device 102 or electronic device 104 can be, for example and not limited to, a mobile phone, a smart phone, a Personal Digital Assistant (PDA), a tablet, a phablet, or the like which are capable of direct communication. Further direct communication means, a communication between two or more electronic devices in proximity, by means of user plane transmission using a radio access technology (for example E-UTRA (LTE)) via a path not traversing any network node. In an embodiment, the electronic device 102 is in proximity to the electronic device 104 where both the devices are in a radio coverage area of the Network node A as shown in the FIG. 1a. In another embodiment, the electronic device 102 in the radio coverage area of the network node A is in proximity to the electronic device 104 in a radio coverage area of the Network node B as shown in the FIG. 1b. In another embodiment, the electronic device 102 is in proximity to the electronic device 104 where both the devices are not in a radio coverage area of the any Network node (out-of-coverage).

The electronic device 102 sends the configuration request to register with the network node A to enable direct communication and charging for the direct communication with the electronic device 104 in the wireless network. The electronic device 102 receives the charging criteria configuration (may be along with its lifetime) from the network node A based on the configuration request sent from the electronic device 102 to register with the network node A in the wireless network. In an embodiment, the configuration can be a default configuration which has a list of permitted applications (like lifetime subscribed application). In another embodiment, the configuration can be a dynamic configuration which consists of a list of applications in which the authorization based on the credentials and subscription (for example: announcing permitted application for a service, where the subscriber subscribed for a short time). Usually the dynamic configuration may have the short lifetime (for example, 6 hours, a week, or 2 days). Once the lifetime expires for the dynamic configuration, the default configuration can be activated if there is no dynamic configuration with the valid lifetime.

The charging criteria can be stored in the secure environment of the electronic device 102. In an embodiment, the charging criteria includes a charging metric which corresponds to the predefined amount of time the electronic device 102 communicates with the electronic device 104 during the D2D communication session. In another embodiment, the charging criteria includes a charging metric which corresponds to a predefined amount of data to be transferred between the electronic device 102 and the electronic device 104 during the D2D communication session. In another embodiment, the charging criteria includes a charging metric which corresponds to a predefined amount of security keys to be used between the electronic device 102 and the electronic device 104 during the D2D communication session. The storage of number of keys or data or time usage information and the execution of the reporting procedure to the network is done in the secure environment in the electronic device 102 that is trusted by the network or the operator. The electronic device 102 dynamically generates charging metric and initiates the D2D communication session with the electronic device 104. During the D2D communication session, the electronic device 102 transmits data to the electronic device 104. Also, the electronic device 102 receives data from the electronic device 104. The electronic device 102 records the charging information associated with the D2D communication session (for transmitted and may also be received). In an embodiment, the charging information includes duration of communication between the electronic device 102 and the electronic device 104 during the D2D communication session. In another embodiment, the charging information includes an amount of data transferred between the electronic device 102 and the electronic device 104 during the D2D communication session (that is account of consumed charging metric).

The electronic device 102 determines whether the recorded charging information meets the charging criteria during the D2D communication session. In an embodiment, counting duration of time the electronic device 102 communicates with the electronic device 104 meets the predefined amount of time during the D2D communication session. The duration of time is dynamically recorded in the charging record. Further, the electronic device 102 determines whether the duration of time meets the charging metric to trigger reporting of the charging information to the network node A. In another embodiment, counting the amount of data transferred between the electronic device 102 and the electronic device 104 meets the predefined amount of time during the D2D communication session. The amount of counted data is dynamically recorded in the charging record. The electronic device 102 determines whether the amount of data meets the charging metric to trigger reporting of the charging information to the network node A. The electronic device 102 reports the charging information to the network node A after determining that the charging information meets the charging criteria.

Further, the electronic device 102 dynamically configures a new charging metric once the charging information meets the charging criteria. The electronic device 102 checks whether the charging metric which is configured (i.e., generated) initially is less than the permitted charging metric and decides on the next charging metric value. The electronic device 102 derives new charging criteria and provides the new charging criteria along with the charging metric. Further, the electronic device 102 initiates the charging metric refreshing process with the new charging metric to resume the D2D communication session with the electronic device 104.

The functionalities performed by the electronic device 102 can also be performed by the electronic device 104 without departing from the scope of the disclosed invention. In an embodiment, the electronic device 104 requests the configuration request from the Network node A in the wireless network as shown in the FIG. 1a. In another embodiment, the electronic device 104 requests the configuration from the Network node B in the wireless network as shown in the FIG. 1b.

The FIGS. 1a-1b show a limited overview of the system 100 but, it is to be understood to a person of ordinary skill in the art.

Figure 2:
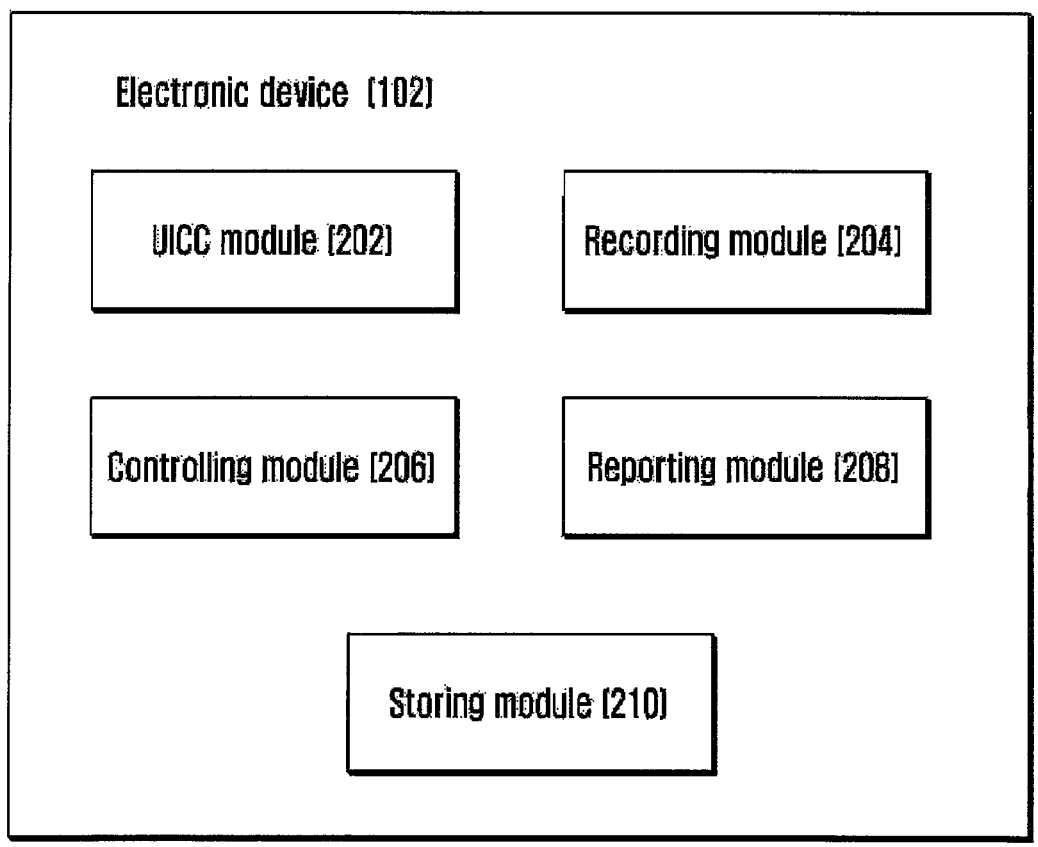
FIG. 2 shows modules in an electronic device which reports a charging information to a network node, according to embodiments as disclosed herein.

FIG. 2 shows modules in the electronic device 102 which reports charging information to a network node as shown in the FIGS. 1a-1b, according to embodiments as disclosed herein. In an embodiment, the electronic device 102 includes a UICC module 202 (i.e., secure environment), a recording module 204, a reporting module 206, a controlling module 208, and a storing module 210. In an embodiment, recording module 204, a reporting module 206, a controlling module 208, and a storing module 210 may be inside the secure environment (UICC module 202). In another embodiment, some of the modules such as the recording module 204, the reporting module 206, the controlling module 208, and the storing module 210 may be inside the secure environment (UICC module 202).

The UICC module 202 or the controlling module 206 of the electronic device 102 is configured to send the request message to register with the network node A and to obtain the configurations (including charging configurations) for the direct communication. Further, the UICC module 202 or the controlling module 206 is configured to receive the charging criteria and may be reporting criteria from the network node A in the wireless network. In an embodiment, the charging criteria includes the charging metric corresponds to the accounting information for charging the electronic device during the D2D communication session. The charging metric is dynamically generated by the UICC module 202 of the electronic device 102 after receiving the request message from the controlling module 206. In another embodiment, the charging criteria includes the charging metric corresponds to the predefined amount of data to be transferred between the electronic device 102 and the electronic device 104 during the D2D communication session. The UICC module 202 is configured to store the charging criteria received from the network node A in the wireless network and also the recorded charging information. The UICC module 202 is configured to send the charging metric to the controlling module 206 after receiving a request message from the electronic device 102. The UICC module 202 is further configured to refresh the charging criteria for D2D communication during the D2D communication session after determining that the charging information meets the charging criteria. In an embodiment, the communication between the UICC module 202 and the Network node A can be protected using a Generic Bootstrapping Authentication (GBA) key (Ks_int/ext_NAF key) derived as part of the GBA procedure performed between the electronic device 102 and the network node A). In another embodiment, the UICC module 202 is provided with a container/space for the network operator to provide service configuration (which includes application or radio configurations) with a time period and also for the UICC module 202 to store the recorded charging information. Once the time period expires, the UICC module 202 deletes the configuration or the UICC module 202 marks the configuration as invalid configuration and issues a proactive command (for example, "REFRESH", c.f, ETSI TS 102 223) to the electronic device 102 to reset the ProSe services/configuration.

In another embodiment, the UICC module 202 may also include a "TIMER MANAGEMENT" proactive command along with the configuration (c.f, ETSI TS 102 223) to the electronic device 102, so that the electronic device 102 starts the configuration till the lifetime mentioned and requests for new configuration from the UICC module 202. Further, the UICC module 202 will not respond to any command related to this service from the electronic device 102 or report error, if there is no valid configuration. In another embodiment, the UICC module 202 may also include the "TIMER MANAGEMENT" proactive command along with the configuration (c.f, ETSI TS 102 223) to the electronic device 102, so that the electronic device 102 replies back for the proactive command of the time period in which the configuration was used by the UICC module 202 to perform accounting.

The recording module 204 can be configured to record the charging information associated with the D2D communication session. The D2D communication session can be established between the electronic device 102 and the electronic device 104. In an embodiment, the recording module 204 records and stores the charging information in the UICC, till it reports the charging information to the network successfully. In an embodiment, the charging information includes the duration of communication between the electronic device 102 and the electronic device 104 during the D2D communication session. In another embodiment, the charging information includes the amount of data transferred between the electronic device 102 and the electronic device 104 during the D2D communication session. In another embodiment, the charging information includes the number of keys issued to the electronic device (for example, controlling module 206) by the UICC module 202 to secure the direct communication between the electronic device 102 and the electronic device 104 during the D2D communication session. The recording module 204 can be configured to send the charging information to the controlling module 206.

The controlling module 206 receives the charging metric from the UICC module 202. In an embodiment, the charging metric corresponds to the predefined amount of time the electronic device 102 communicates with the electronic device 104. In another embodiment, the charging metric corresponds to the predefined amount of data to be transferred between the electronic device 102 and the electronic device 104. The controlling module 206 receives the charging information from the recording module 204. In an embodiment, the controlling module 206 can be configured to account the duration of time the electronic device 102 communicates with the electronic device 104 during the D2D communication session. Here, the duration of time is dynamically recorded in the charging record. In another embodiment, the controlling module 206 can be configured to count the amount of data transferred between the electronic device 102 and the electronic device 104 during the D2D communication session. Here, the amount of counted data is dynamically recorded in the charging record. In another embodiment, the controlling module 206 can be configured to count the number of keys issued to the electronic device by the UICC module 202 to secure the direct communication between the electronic device 102 and the electronic device 104 during the D2D communication session. Here, the number of keys issued is dynamically recorded in the charging record.

The controlling module 206 is configured to determine whether the charging information meets the charging criteria during the D2D communication session to trigger reporting of the charging information to the network node A in the wireless network. In an embodiment, the controlling module 206 can be configured to determine whether the duration of time meets the charging metric to trigger reporting of the charging information to the network node A in the wireless network. In another embodiment, the controlling module 206 can be configured to determine whether the amount of data meets the charging metric to trigger reporting of the charging information to the network node A in the wireless network. The charging criteria can be configured by the network node A in the UICC module 202 of the electronic device 102. The controlling module 206 is configured to send a request message to the reporting module 208 whether to trigger reporting of the charging information to the network node A in the wireless network, based on the reporting configuration or when came back to network coverage.

The reporting module 208 can be configured to report the charging information to the network node A in the wireless network after determining that the charging information meets the charging criteria or measurement period has been reached or based on the reporting configuration period. The storing module 210 stores control instructions to perform various operations in the system 100.

Although the modules described above are with respect to the electronic device 102, it is to be understood to a person of ordinary skill in the art that the same modules can be present in the electronic device 104.

The FIG. 2 shows a limited overview of the system 100 but, it is to be understood to a person of ordinary skill in the art. Further, the system 100 can include different modules communicating among each other along with other components.

Figure 3A:
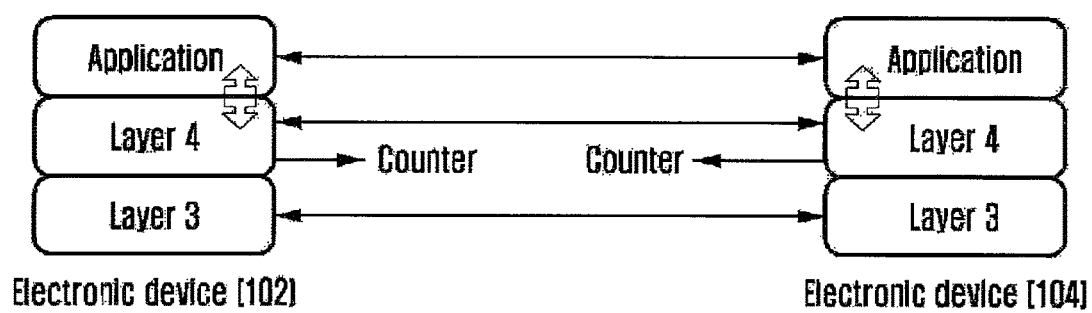
FIGS. 3a-3b illustrate accounting of a Transmission Control Protocol (TCP) packet received by an electronic device, according to embodiments as disclosed herein.
Figure 3B:
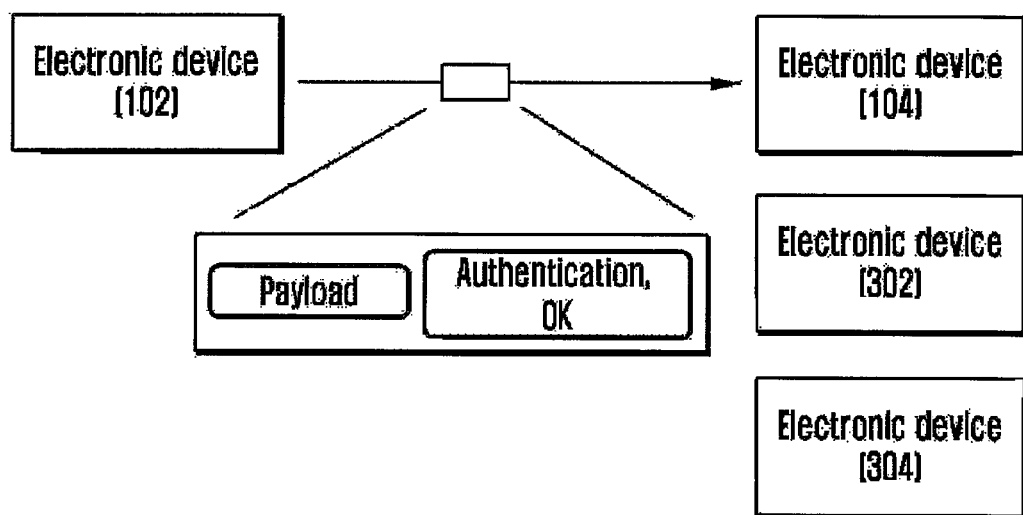

FIGS. 3a-3b illustrates accounting of a Transmission Control Protocol (TCP) packet received by an electronic device, according to embodiments as disclosed herein. In an embodiment, the electronic device 102 sends data to the electronic device 104. At layer 3 (i.e., L3-Internet Protocol (IP) layer) it is not possible for the electronic device 102 to determine whether the data is received by the electronic device 104. However, at layer 4 (i.e., L4-TCP layer), it is possible to determine whether the data was received by the electronic device 104 as the received transmission of data from the electronic device 102 are acknowledged. Further, it is possible for the operating system (including the Transmission Control Protocol (TCP) implementation) to determine when an application obtain buffers received if the electronic 102 intend to count the data that is delivered to the applications. It is be possible to compare the data sent by the electronic device 102 to the electronic device 104 (i.e., in the electronic device 102's counter) to the data volume purported to have been received by the electronic device 104. If the electronic device 104 claims a number less than the electronic device 102 identifies as having been acknowledged as being received, then the electronic device 104 is under-reporting the data volume received from the electronic device 102.

It can be difficult to perform accounting of data as it is in the operating system (i.e., the electronic device) that the transport layer (L4) terminates, not in the lower layers (L1-L3 in the electronic device).

In an embodiment, accounting of the data volume received should be left to the electronic devices to account for autonomously and report (or potentially under-report) as it is not feasible to account for the data volume received in a distributed manner. The mechanism then would be to account for data sent by other electronic devices (i.e., by counting the amount of data received at each electronic device). This would also serve as an accounting of data received by each node. It would be difficult to under-report data transmitted, assuming that most of the electronic devices are honest about the data volume they receive from the primary electronic device. It can be complex to gather and reconcile electronic device reports (especially if the electronic devices belong to distinct network nodes). If most of the electronic devices under-report what they receive then it would be difficult to detect the electronic device that under-reports what it sends. This mechanism does not support the 'credit limited' direct data transmission scenario. There can be a threat with the malicious electronic devices for this approach, which can send over/under-report randomly against the genuine electronic devices.

"X"=>group "Y"

Here, "X" refers to the data volume sent to the group "Y". The receivers of group "Y" should count the volume received from the sender "X". It is not possible unless there are very detailed charging records associated with the electronic devices are summed to determine if X is underreporting.

For example, if "X" sends 1000 bytes to group "Y". This data was received by the group members "U", "V", and "W". The "U" received 600, "V" received 700, and "W" received 1000. Thus, the network node can look at each electronic device separately. If any group member received more from the "X" than "X" claims to have sent, only then it will be clear that the "X" has under-reported.

X"=>"U"

where, "X" counts the number of data packets sent, "U" counts the number of data packets received. If the "U" shows more than the data what "X" claims, this can be the indication that the "X" is under-reporting.

Group "Y" transmissions received by "X"

"X" counts the number of data packets received including the source address of the transmitter in order to charge the sender of the data packets. As the transmission of data is to a group, it is very difficult to detect the electronic device under-reports. Therefore, it is asserted that it is not worth creating a specific mechanism to check the amount received by the electronic device.

"U"=>"X"

In another embodiment, an attempt to provide support for both the 'credit limited' and "credit accounted" direct data transmission scenario can be explained below.

Charging Key Identified Transmissions:

An electronic device 102 can be (pre-) provisioned with a credit limit in the UICC module 202. A new UICC to the electronic device 102 interaction can be introduced in which the UICC module 202 provides the electronic device 102 with the charging metric which is meant to support a limited amount of data transmission volume. The charging metric can be exchanged as part of authorization between the electronic device 102 and the electronic device 104 (i.e., consider it as a parameter of 'Device-to-Device session management'). The charging metric can be securely distributed or provided to the electronic device 104 for direct communication as part of configuration. By providing the charging metric, the electronic device 102 can account for the key exchange volume. By providing the charging metric during the direct communication to the electronic device 102 and could be used for the volume of the security exchange too. By providing the charging metric after direct connection establishment has the advantage, that the session is already secured; however, there is likely to be no more control signaling between the electronic device 102 and the electronic device 104 after the security session set up and further, the data volume used during the security exchange cannot easily be accounted.

These procedures could be used for communications 1:many, when the 1:many communications involved an authorization component. If the data were transmitted in an authenticated payload, the authenticator ID could be associated with the charging metric. The electronic device 102 multicast 1:many all payloads along with authentication information and identifying the charging metric. Each of the electronic device 104, an electronic device 302, and an electronic device 304 which receives the payload would check the authentication information (e.g. an integrity protection (Hash Message Authentication Code (HMAC) checksum) using a shared secret, confidentiality protection (encryption and decryption) and so on) and store accounting information counting the amount of data received from the electronic device 102 and the associated charging metric as shown in the FIG. 3b.

The electronic device 102 counts all the data it has sent to the electronic device 104, electronic device 302, and electronic device 304. The reports from the electronic device 102 can be checked against the other electronic devices (i.e., electronic device 104, electronic device 302, and electronic device 304) to make sure that none of the electronic devices (i.e., electronic device 104, electronic device 302, and electronic device 304) received more data than the electronic device 102 claims to have sent. Further, it can be possible to detect overuse of the charging metric by checking other electronic device (i.e., electronic device 104, electronic device 302, and electronic device 304) records.

The charging metric could explicitly list the maximum volume supported. Any electronic device (i.e., electronic device 104, electronic device 302, and electronic device 304) receiving data from the electronic device 102 associated with the charging metric with a limit, where the charging metric limit is exceeded, could report the violating electronic device to the network node A. The electronic device 102 requests the new charging metric from the UICC module 202 of the electronic device 102. The operator can place the configured limit on the total volume of data; thereby, preventing the electronic device 102 from using more than a certain amount of data. The operator can receive data from the UICC module 202 of the electronic device 102 through management protocols and/or control plane signaling that would allow counting the number of charging metric granted to the electronic device 102.

Further, there is no active mechanism for preventing the electronic device 102 from misusing the network. The electronic device 102 avoids performing because it will be reported later and there would be charging consequences for the electronic device 102. If security procedures are performed at an application layer, then it should not be that, "a cracked ProSe Application-xyz installed in Prose devices never troubles to refresh the initial key". Hence, in-order to have complete control by the network, it is recommended to have the security mechanism (charging metric refresh) in the modem (may be at Access Stratum (AS) or the Non Access Stratum (NAS) layer).

The charging metric allows operator to control the amount of authorized transmission. It also allows the operator to detect improper behavior by other electronic devices (i.e., they could detect and report violations of volume limits). The mechanism would be linked to authorization of transmission either data using 1:1 or 1:many ProSe communication.

In another embodiment, only one configuration is provided by the network with validity time. In an embodiment, configuration contains only the charging related information from the operator such as the number of keys the device can obtain and use, volume of data allowed (for example, number of packets, number of discovery announcements), and the like. The ProSe configurations provided by the network are stored in the secure environments (for example in UICC and also in the Mobile equipment (ME)) within the UE and the UICC provides the configuration to the UE. The configurations are provided by the network (for example, Direct Provisioning Function (DPF), OAM server) with protection to the secure environment directly (example using OTA mechanisms and may be using SIM Application Toolkit (STK) (USIM Application Toolkit (USAT) or Card Application Toolkit (CAT))).

Figure 4:
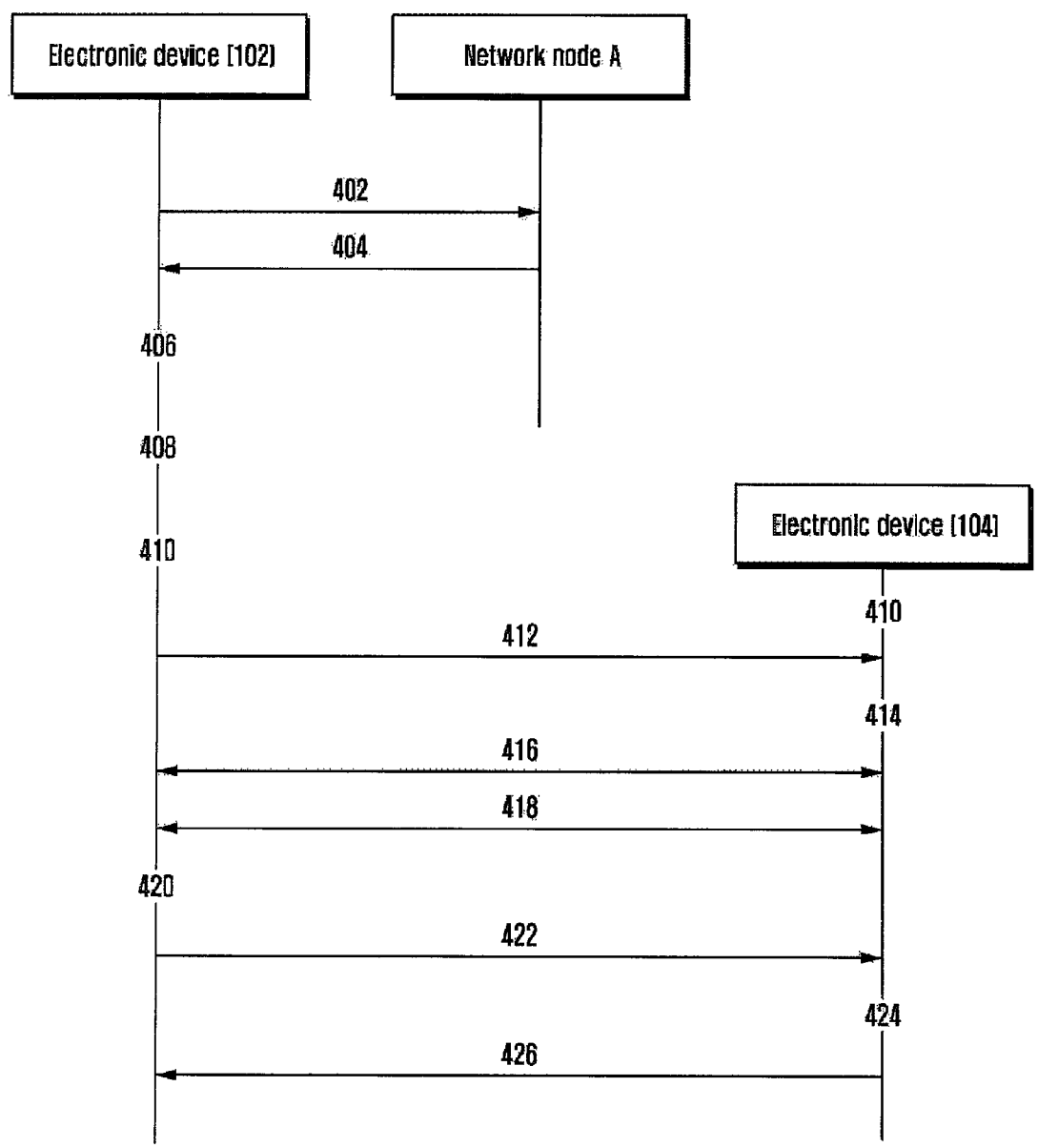
FIG. 4 illustrates a sequence diagram for a volume based charging using a security procedure, according to embodiments as disclosed herein.

FIG. 4 illustrates a sequence diagram for a volume based (also key based) charging using a security procedure, according to embodiments as disclosed herein. In an embodiment, the FIG. 4 illustrates a sequence diagram for unicast communication (1:1) and also applicable for multicast or broadcast (1:many) communication, where there will be one or more electronic devices 104 receiving the communication packets transmitted by the electronic device 102. In order to confirm sufficient level of trust, secure environment within the electronic device 102 imposes accounting limits for direct communication. The secure environment allows the networks to control and also collect the data on the amount of authorized transmission and receptions. By linking security mechanism with charging functions, an acceptable level of trust is achieved for the ProSe accounting. A potential mechanism would be to allow the secure environment to perform accounting based on the number of security keys issued to the electronic device 102 by the secure environment or the time allowed for ProSe direct communication. The ProSe accounting related parameters are included and configured in the secure environment by the network (ProSe function, an entity in the network performs ProSe function), along with the provisioning parameters for ProSe direct communication (3GPP TS 23.303). The secure environment that has been configured for ProSe has the accounting capabilities and may be provisioned with a credit limit based on network policy or subscription (prepaid or post-paid). The credit limit and accounting information are based on the number of keys to be provided (from which number of messages received and transmitted using PDCP count can also be derived) by the secure environment to the electronic device 102 for ProSe direct communication. Further, linking of the security mechanism with the charging function is achieved by making the electronic device 102 to obtain parameters needed for its security context (for example ProSe Traffic Key) from the secure environment always, so that the electronic device 102 communicates with other electronic devices 104 securely. Eventually when exhausting the security context after particular volume of data transmission, the electronic device 102 needs to obtain fresh ProSe traffic key in order to further communicate with other electronic devices 104, when requested for new key by the electronic device 102, the secure environment will account the number of keys issued to the electronic device 102 and provides the new ProSe traffic key. By doing so, the secure environment within the electronic device 102 can collect the information on the number of keys received by the electronic device 102 over a period of time or control the number of keys to be issued based on the preconfigured credit limit. The operator retrieves the accounting information from the secure environment directly which operator can trust the information for generation of the Charging Data Records (CRDs). Optionally, the operator may also authorize some maximum amount of key to be retried (e.g. prepaid) in the secure environment to control the credit limits. The ProSe communication uses group pre-shared key provisioned by the network and securely storage in the secure environment and the ProSe traffic key is derived from the group pre-shared key to protect the group communication data traffic. Since the secure environment provides the ProSe traffic key for limited volume of data, the secure environment can account the volume of data based on the number of keys issued and report the accounting data to the network to generate CRD for the UE.

As shown in the FIG. 4, the charging metric being the traffic/session key derived by the secure environment for securing the communication also for recording the charging information. Initially, the electronic device 102 sends (402) a ProSe direct configuration request or registration request to the network node A to enable charging for the D2D communication. After receiving the ProSe direct configuration request from the electronic device 102, the network node A sends (404) the ProSe direct configuration response or registration response with a permitted charging threshold value(s) to the electronic device 102. In an embodiment, the service authorization for direct services is performed for direct communication and the electronic device 102 is configured with the related configurations of radio or charging or reporting the relevant information for direct communication. The electronic device 102 obtains the necessary direct communication context including the accounting information (i.e., permitted threshold value). In another embodiment, the permitted threshold value can be duration of time the electronic device 102 communicates with the electronic device 104 or the validity time of the security context (for example group key). In another embodiment, the permitted threshold value can be the amount of data to be transferred between the electronic device 102 and the electronic device 104. In another embodiment, the permitted threshold value can be number of keys the electronic device 102 obtains from the secure element for communication with the electronic device 104.

The electronic device 102 stores (406) the received configuration including the permitted threshold value from the network node A in the UICC module 202 of the electronic device 102. The electronic device 102 requests (408) configuration including the permitted threshold value from the UICC module 202, the session key to protect the communication. In an embodiment, the UICC module 202 derives the session key and provides the configuration may be with its lifetime to the electronic device 102. The electronic device 102 initiates (410) the ProSe announcement message for establishing the direct communication with another electronic device which is in proximity by establishing the session or alternatively the electronic device 102 starts sending direct communication messages. In an embodiment, during session establishment, the permitted threshold values are exchanged between the electronic devices. The electronic device 104 derives the session key and starts monitoring (410) for any ProSe announcement message for establishing the direct communication or for any direct communication message itself. The electronic device 102 sends (412) the ProSe announcement message to the electronic device 104 for establishing direct communication. In an embodiment, the electronic device 102 sends the required parameter for key derivation in the PDCP header or MAC header of the user plane data packet itself, so that the electronic device 104, after receiving the data packet generates the necessary key to verify the message and/or decrypt the message. In an embodiment, at step 410, since the UICC provides the session key to the electronics device, the UICC starts account the number of keys issued to the electronics device along with the other parameters like UE ID, Group ID, Key identity (Pre-shared key ID, ProSe traffic key ID), time of request.

On receiving the ProSe announcement message from the electronic device 102 for establishing direct communication, the electronic device 104 accepts (414) the ProSe announcement message; thereby, establishing the direct communication session with the electronic device 102. Further, the electronic device 102 establishes (416) a direct communication session with the electronic device 104 where the authentication can be achieved using certificates or using UICC credentials. An initial threshold value can be exchanged between the electronic device 102 and the electronic device 104. The session key for the session can be derived by the UICC module 202 of the electronic device 102. The session key derivation may include the exchanged threshold value. In an embodiment, the electronic device 104 receives data packets directly without any service establishment procedure from the electronics device 102. The electronic device 102 initiates (418) data transfer with the electronic device 104; thereby, increasing the counter values in the electronic device 102 and the electronic device 104 for every data packet transfer. If the electronic device 102 determines (420) that the count is about to reach the exchanged threshold value, then the electronic device 102 requests the UICC module 202 to provide a new session key and a next threshold value. The UICC module 202 checks whether the initial threshold value is less than the permitted threshold value and decides on the next threshold value. After deciding the next threshold value, the UICC module 202 derives the new session key using the new threshold value and provides the new session key and corresponding threshold value to the electronic device 102. In an embodiment, if the security parameters are included in the message itself, then any change in the security parameters will make the electronic device to request for a new key.

The UICC module 202 of the electronic device 102 initiates (422) the key refresh procedure and provides the new threshold value. The electronic device 104 requests (424) the UICC module 202 to provide the new key and by using the new threshold value of the electronic device 102, the UICC module 202 derives the new key using the new threshold value and provides the new key. In an embodiment, the new session key (i.e., traffic key) can be derived as follows:

Derivation of key for the direct communication session:

$K_{ProSe-Session}$=KDF {$K_{Pre-shared}$, electronic device 102 ID, electronic device 104 ID, $Volume_{Threshold\ of\ electronic\ device\ 102}$, $Volume_{Threshold\ of\ electronic\ device\ 104}$, <possibly further parameters>}

$K_{ProSe-session}$=Used to protect the data exchange between the ProSe electronic devices or used to derive further keys (for example, encryption key which is used to protect the direct communication between the electronic devices). In an embodiment, the $K_{ProSe-session}$ key is valid only till the data transfer reaches the threshold value ($Volume_{Threshold\ electronic\ device-x}$) or valid till the life time of the pre-shared key.

$K_{Pre-shared}$: Established as part of session establishment or configured by the network when performing service authorization or the electronic device request the network to provide $K_{Pre-shared}$ for a particular group ID or for the particular device identity.

In an embodiment, $K_{Pre-shared}$ can be specific to each ProSe electronic device or to a specific group, so $K_{Pre-shared}$ are to be used for the session/traffic key $K_{ProSe-Session}$ generation. The electronic device (102) ID is the identity of the ProSe device which transmits the user plane data packets. The electronic device 104 ID of the receiver may also be included as one of the input parameter in the key derivation (incase of 1:many communication, receiver IDs are not included). The $Volume_{Threshold-electronic\ device-x}$ may be used for $K_{ProSe-Session}$ generation and provided by the UICC module 202 based on the permitted volume threshold value. The $Volume_{Threshold-electronic\ device-102}$ value will be less than or equal to the permitted threshold value. The VolumeThreshold of electronic device 104 may also be included as one of the input parameter in the key derivation.

The UICC module 202 can decide to divide the permitted threshold values so as to refresh session key, so that the session key will not be used for a long time. $Volume_{Threshold-electronic\ device-x}$ value cannot be the permitted value (pre-paid capacity); it can be random within the total credit limit. The UICC module 202 cannot provide the new $Volume_{Threshold-electronic\ device-x}$ and the session key if the $Volume_{Threshold-electronic\ device-x}$ reaches the permitted threshold value. Since the permitted threshold value is not known to the electronic device 102 and $Volume_{Threshold}$ is required to refresh the charging metric, complete control on the charging can be achieved by the security mechanism. In an embodiment, the accounting is performed based on the aggregated $Volume_{Threshold}$ or $Volume_{COUNT}$, when there is no pre-assigned limit applied (for example Post-paid scenario).

The data transfer resumes (426) between the electronic device 102 and the electronic device 104 with the new session key; thereby, incrementing the counter value for each data packet transfer from '0'. In an embodiment, the UEs reports the accounting details at-least one of number of keys issued, ID of the UE, IDs of the other ProSe UEs, time information, volume of data transmitted or received (in terms of $Volume_{Threshold}$) to the network entity (i.e., ProSe Function) securely through management protocols, periodically or when the UE establishes communication with the network or based on the network configured reporting period. The accounting details contain its information and also other UEs information it communicates with. For UEs in "out of network coverage" scenarios, the ProSe session accounting data is reported to the network, when the UEs enter into the coverage are of the network (i.e., offline accounting). Therefore, delayed reporting of the ProSe session accounting data is possible. The ProSe function may consolidate the report received from different UEs and prepares the CRDs. A fraudulent use of keys could be detected by means of discrepancies (more data was received from the UE than it claims to have sent) among the reports from the listening UEs.

Figure 5:
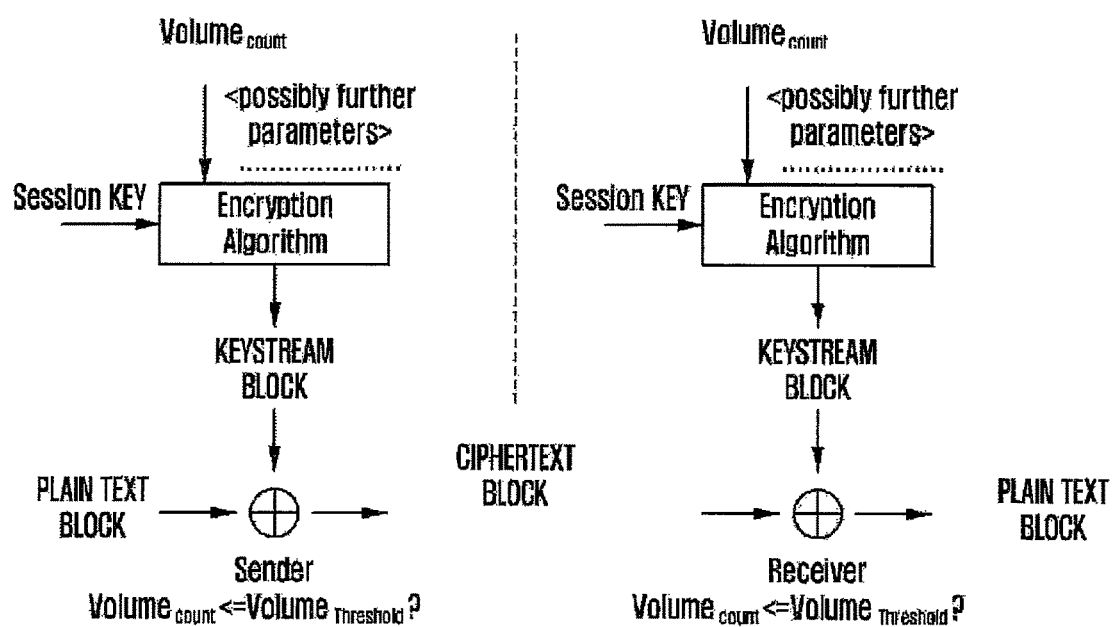
FIG. 5 illustrates a ProSe charging using a security procedure, according to embodiments as disclosed herein.

FIG. 5 illustrates a ProSe charging using a security procedure, according to embodiments as disclosed herein. In an embodiment, for key or volume based charging, in addition to the key derivation disclosed in the FIG. 4, $Volume_{COUNT}$ and $Volume_{Threshold}$ may be used to ensure and enforce that the other party in communication expects new fresh charging metric once the $Volume_{COUNT}$ meets with the $Volume_{Threshold}$. The number of charging metrics used with $Volume_{COUNT}$ and $Volume_{Threshold}$ provide accounting for both post-paid and pre-paid charging options for the network node A operator. The security mechanism for the volume based charging is shown below.

Charging Metric Protection:

For every charging metric establishment (including charging metric refreshing), the $Volume_{COUNT}$ value can be initialized to "0" and can be incremented for every packet sent from the electronic device 102 to the electronic device 104. The $Volume_{COUNT}$ can be incremented based on the application data size. The $Volume_{COUNT}$ value can be carried along with the message. The $Volume_{COUNT}$ can be a Packet Data Convergence Protocol (PDCP) COUNT, if the ProSe uses the existing PDCP layer. In an embodiment, to enforce charging, at-least one of the security mechanisms such as a Confidentiality protection (encryption/decryption) and an integrity Protection can be performed for the application payload at any layer. In an embodiment, NULL algorithm can be used for charging purpose. In another embodiment, the disclosed method can be applied to only specific messages (for example, standalone discovery messages, User Datagram Protocol (UDP) packets, session establishment messages, signaling messages) or specific application (for example, Advertisements, Data transfer, etc.). In another embodiment, the complete protection of the application data can be enabled. In another embodiment, partial protection of the application data can be enabled.

Since the permitted threshold value is not known to the electronic device 102 and it is required to refresh a session key for every intermediate $Volume_{Threshold}$, the electronic device 102 always depends on the threshold value and the refreshed session key as shown in the FIG. 5. In another embodiment, the security mechanism enforcing the charging policies is performed in at least one of the AS layer, Internet Protocol (IP) layer, or the Application layer. It can be possible to perform one or more combinations of the embodiments disclosed for direct communication charging.

Figure 6:
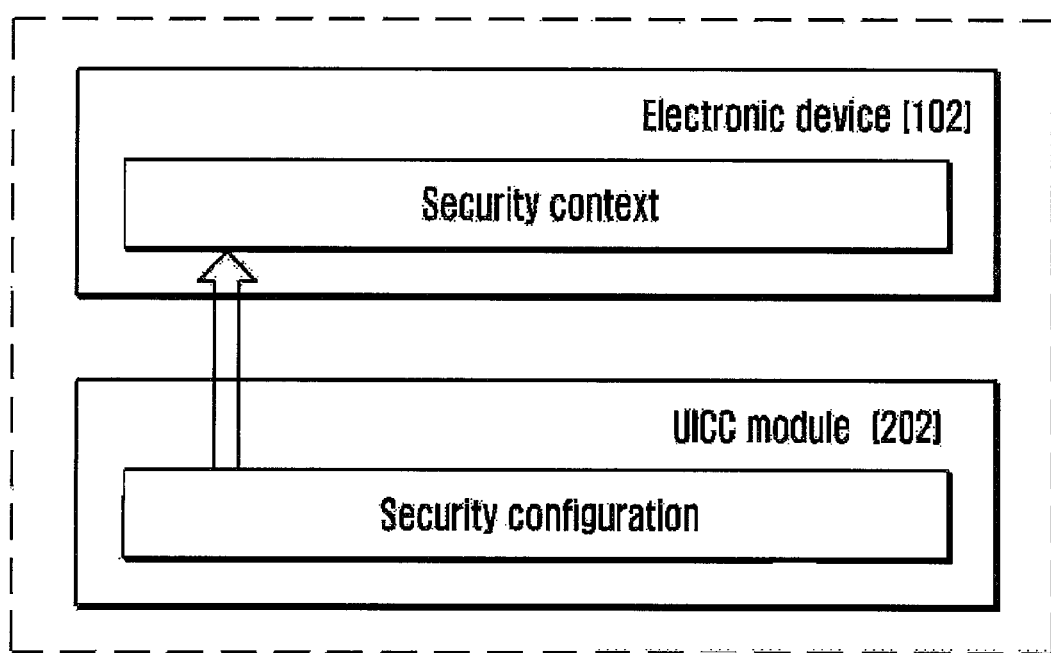
FIG. 6 illustrates an example of an UICC module imposing credit/debit limits for the D2D communication, according to embodiments as disclosed herein.

FIG. 6 illustrates an example of an UICC module 202 imposing credit/debit limits for the D2D communication, according to embodiments as disclosed herein. The electronic device 102 requires application (say security) configuration from the UICC module 202. Since the UICC module 202 has a persistent memory and is trusted components of the operator in the electronic device 102, the operator can read and write persistent storage when the electronic device 102 is in radio coverage area of the operator. The configuration can be used by the electronic device 102 to activate the D2D communication with the electronic device 104 and further the operator enforces the application use of services.

Figure 7:
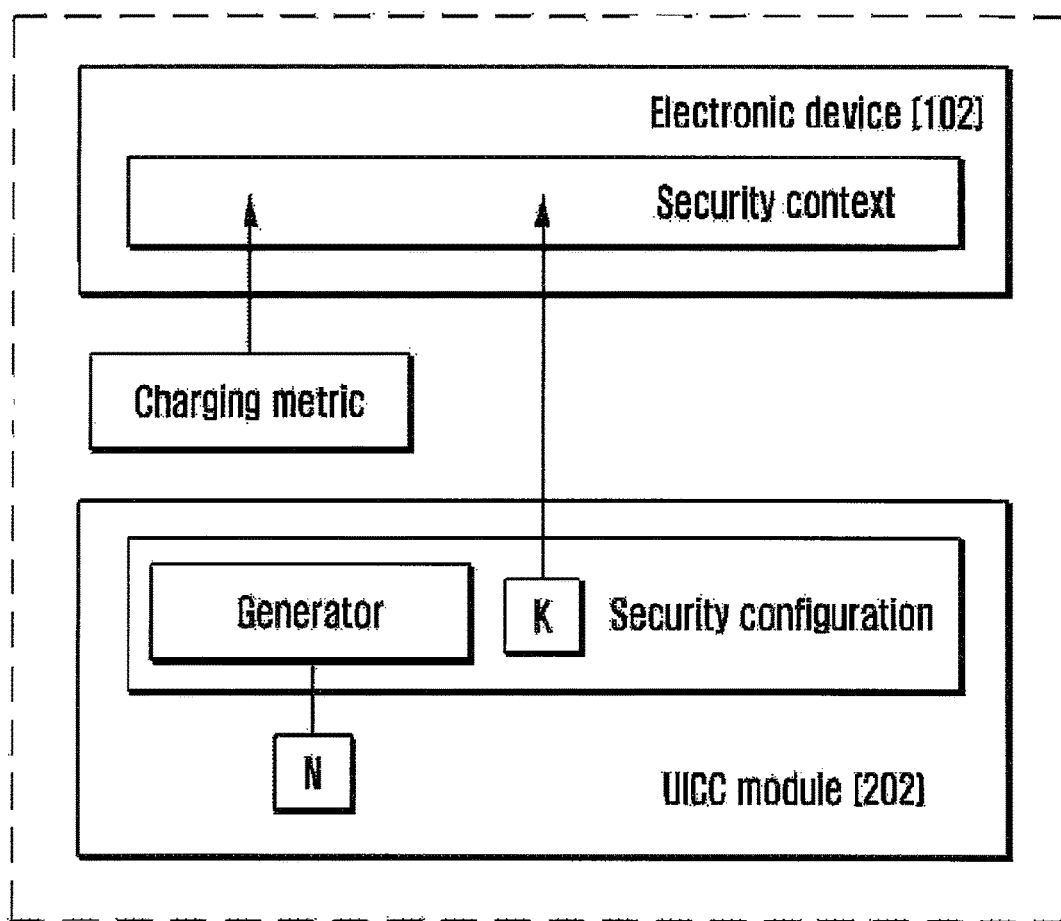
FIG. 7 illustrates an example of an UICC module imposing charging as offline allocations, according to embodiments as disclosed herein.

FIG. 7 illustrates an example of an UICC module 202 imposing charging as offline allocations, according to embodiments as disclosed herein. The UICC module 202 generates the charging metric which is valid only for a certain capacity, time interval, etc. (i.e., whatever is to be charged) and can be for a particular application or for a communication with the particular electronic device. The UICC module 202 records each generation persistently (as N). The "K" (charging material, etc) can be provided to the electronic device 102 from the UICC module 202 to allow secure communication with the electronic device 104. The algorithm used for secure communication depends on the charging metric and K.

Figure 8:
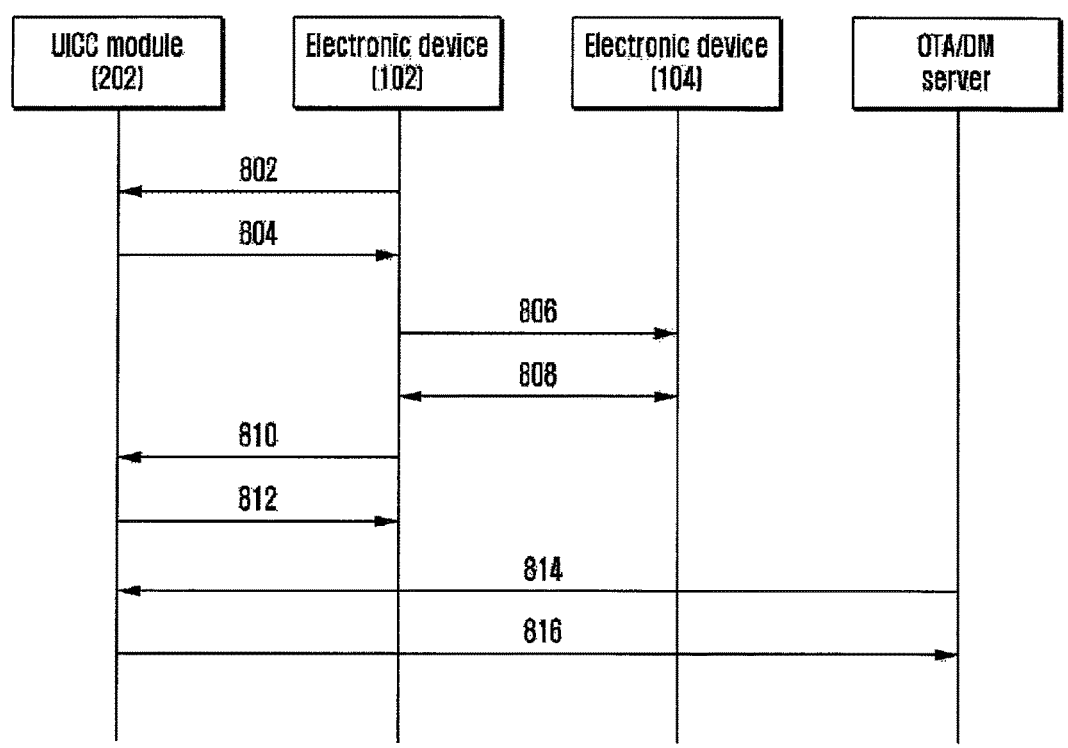
FIG. 8 illustrates a sequence diagram of charging as offline allocations, according to embodiments as disclosed herein.

FIG. 8 illustrates a sequence diagram of charging as offline allocations, according to embodiments as disclosed herein. Initially, the electronic device 102 sends (802) the request message to the UICC module 202 (which is attached to the electronic device 102) for obtaining parameters (i.e., $C_i$, K) needed for its security context. After receiving the request message, the UICC module 202 sends (804) the parameters (i.e., $C_i$, K) to the electronic device 102 for its security context. Further, the electronic device 102 communicates (806) with the electronic device 104 with the obtained parameters (i.e., $C_i$, K) from the UICC module 202 of the electronic device 102. The electronic device 102 initiates (808) the data transfer with the electronic device 104 based on the obtained parameter (i.e., $C_i$, K) and eventually exhausts $C_i$. Further, the electronic device 102 sends (810) the request to UICC module 202 to obtain $C_{i+1}$. Further, the UICC module 202 sends (812) $C_{i+1}$ to the electronic device 102 in order to communicate with the electronic device 104. The operator can retrieve the value of N. Further, the operator can also authorize some maximum amount of N to use (e.g. prepaid credit). Over-the-Air (OTA)/Device management (DM) server requests (814) the UICC module 202 to obtain N, and authorize $C_i$+N. In response, the UICC module 202 sends (816) the stored value N to provide charging and billing information.

In an embodiment, the $C_i$ is needed for each item that the electronic device 102 can be charged for (discovery, being discovered, volume, time of use, and so on). The security algorithm is designed to "use up $C_i$" which is only valid until it has reached a maximum number of iterations. For credit control, even if the operator never obtains N, a preconfigured maximum amount of credit can be used up. For charging for application use of services per Protocol Data Unit (PDU) transmission or per transaction completion by the electronic device can imply $C_i$ iteration (thereby "using it up."). For off-line charging, the stored value N can be obtained by the operator (once the electronic device 102 is in coverage, and so on.) This data can be used as input to provide charging and billing information.

Figure 9:
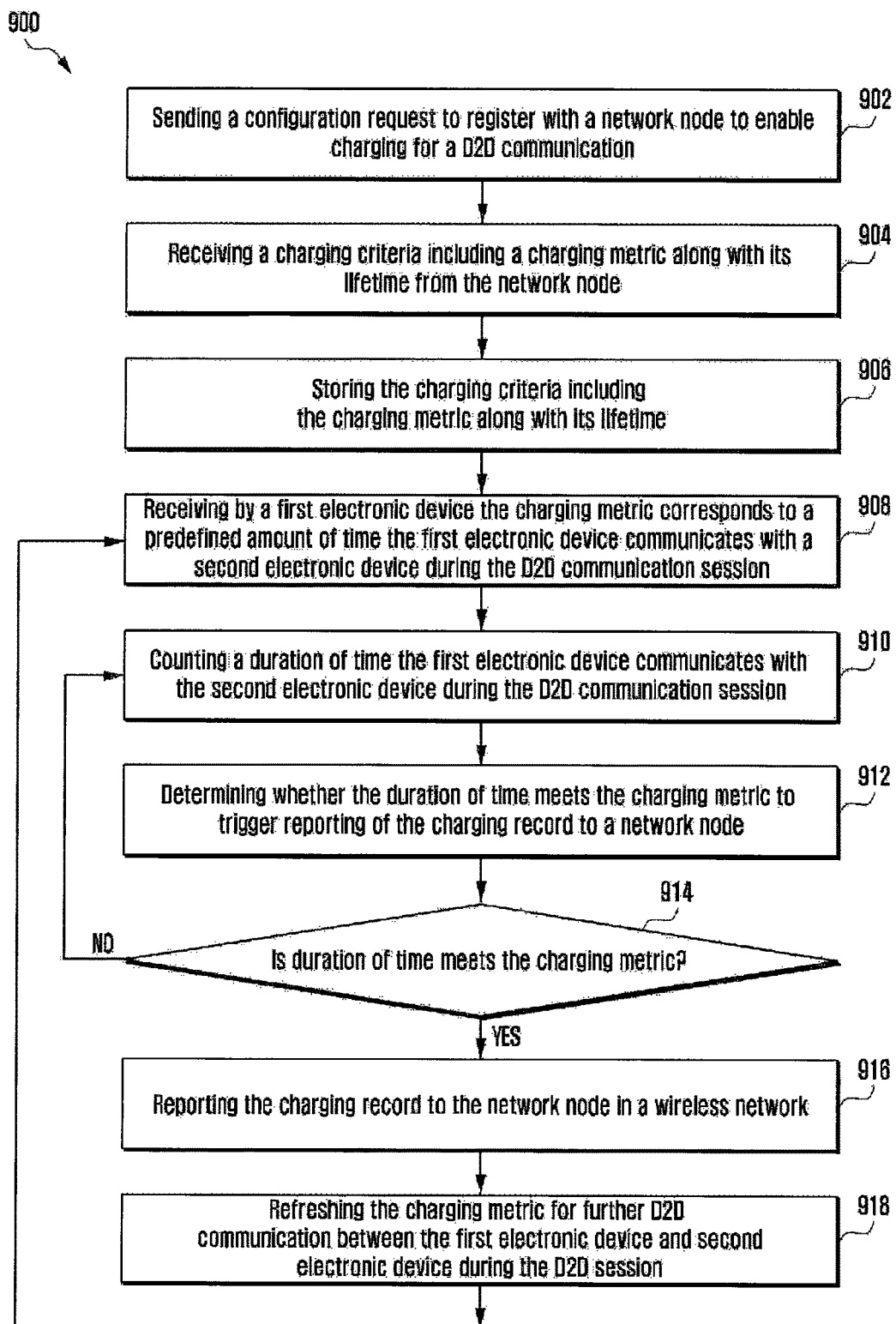
FIG. 9 is a flow diagram illustrating a method of reporting a charging information to a network node including a duration of time a first electronic device communicates with a second electronic device, according to embodiments as disclosed herein.

FIG. 9 is a flow diagram illustrating a method 900 of reporting a charging information including duration of time a first electronic device communicates with a second electronic device to a network node, according to embodiments as disclosed herein. At step 902, the method 900 includes sending a configuration request to register with the network node to enable charging for the D2D communication between the first electronic device and the second electronic device. In an embodiment, the method 900 allows the UICC module 202 of the first electronic device to send the configuration request to register with the network node to enable charging for the D2D communication between the first electronic device and the second electronic device. At step 904, the method 900 includes receiving the charging criteria including the charging metric along with its lifetime from the network node. In an embodiment, the charging criteria includes the charging metric corresponds to the predefined amount of time that the first electronic device communicates with the second electronic device during the D2D communication session. In another embodiment, the charging criteria includes the charging metric corresponds to the predefined amount of data to be transferred between the first electronic device and the second electronic device during the D2D communication session. In an embodiment, the method 900 allows the UICC module 202 of the first electronic device to receive the charging criteria including the charging metric along with its lifetime from the network node. At step 906, the method 900 includes storing the charging criteria including the charging metric along with its lifetime. In an embodiment, the method 900 allows the UICC module 202 to store the charging criteria including the charging metric along with its lifetime. At step 908, the method 900 includes receiving by the first electronic device the charging metric corresponds to a predefined amount of time the first electronic device communicates with the second electronic device during the D2D communication session. In an embodiment, the method 900 allows the controller module 206 of the first electronic device to receive the charging metric corresponds to the predefined amount of time the first electronic device communicates with the second electronic device during the D2D communication session from the UICC module 202.

At step 910, the method 900 includes counting duration of time the first electronic device communicates with the second electronic device during the D2D communication session. In an embodiment, the method 900 allows the recording module 204 of the first electronic device to count the duration of time the first electronic device communicates with the second electronic device during the D2D communication session. At step 912, the method 900 includes determining whether the duration of time meets the charging metric to trigger reporting of the charging information to the network node. The method 900 allows the controlling module 206 of the first electronic device to determine whether the duration of time meets the charging metric to trigger reporting of the charging information to the network node. If it is determined at step 914 that the duration of time meets the charging metric, then at step 916, the method 900 includes reporting the charging information to the network node in the wireless network. The method 900 allows the reporting module 208 to report the charging information to the network node in the wireless network. For example, the electronic device 102 reports the amount of data that is sent and received to the network node "A", whenever the communication is established with the network node "A". After registration with the Network node "A" (during NAS signaling (i.e., attach or tracking area update or AS signaling) or using a new signaling messages, the electronic device 102 sends the charging usage report. However, this approach does not allow the (pre-) authorization of using the network resources based on the credit limits, and so on. If the direct communication is being used by the electronic device 102 in the coverage area of the network node "A", then the network node "A" monitors the transmission of the charging information (i.e., amount of time) from the electronic device 102 for accounting. Based on the charging record, the network node "A" configures the electronic device for direct communication service based on the credits. In another example, the electronic device 102 counts its own usage and the usage of the communication device (i.e., electronic device 104). It is also possible for the one or more operators to reconcile the information in order to detect fraud. If it is determined at step 914 that the duration of time does not meet the charging metric then at step 910, the method 900 includes counting the duration of time the first electronic device communicates with the second electronic device during the D2D communication session. In an embodiment, the method 900 allows the recording module 204 to count the duration of time the first electronic device communicates with the second electronic device during the D2D communication session. At step 918, the method 900 includes refreshing the charging metric for further D2D communication between the first electronic device and the second electronic device during the D2D communication session. In an embodiment, the method 900 allows the UICC module 202 to refresh the charging metric for further D2D communication between the first electronic device and the second electronic device during the D2D communication session. After refreshing the charging metric, at step 908 the method 900 includes receiving by the first electronic device the charging metric corresponds to a new predefined amount of time the first electronic device communicates with the second electronic device during the D2D communication session. In an embodiment, the method 900 allows the controller module 206 to receive the charging metric corresponds to the new predefined amount of time the first electronic device communicates with the second electronic device during the D2D communication session.

The various actions, acts, blocks, steps, and the like in method 900 may be performed in the order presented, in a different order or simultaneously. Further, in some embodiments, some actions, acts, blocks, steps, and the like may be omitted, added, modified, skipped, and the like without departing from the scope of the invention.

In an embodiment, the first electronic device receives the charging metric corresponds to a predefined number of keys to be used to secure communication between the first electronic device and the second electronic device during the D2D communication session. The charging metric is dynamically generated by the secure environment of the first electronic device in response to receiving a request message from the first electronic device. Further, the first electronic device counts a number of keys used between the first electronic device and the second electronic device during the D2D communication session. The number of keys is dynamically recorded. Furthermore, the first electronic device determines whether the duration of time meets the charging metric to trigger reporting of the recorded charging information to the network node.

Figure 10:
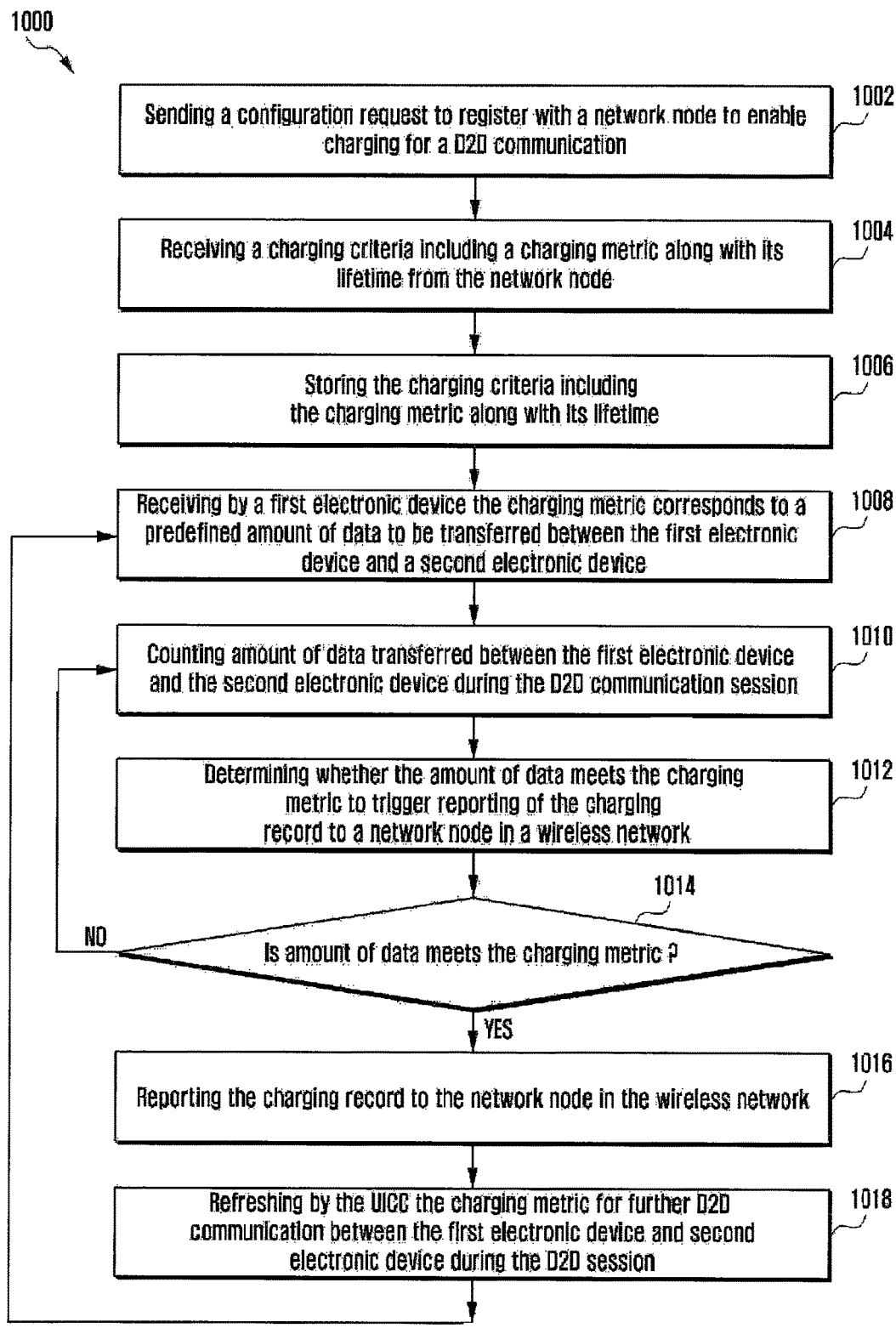
FIG. 10 is a flow diagram illustrating a method of reporting a charging information to a network node including an amount of data transferred between a first electronic device and a second electronic device, according to embodiments as disclosed herein.

FIG. 10 is a flow diagram illustrating a method 1000 of reporting charging information including an amount of data transferred between a first electronic device and a second electronic device to a network node, according to embodiments as disclosed herein. At step 1002, the method 1000 includes sending a configuration request to register with the network node to enable charging for the D2D communication between the first electronic device and the second electronic device. In an embodiment, the method 1000 allows the UICC module 202 of the first electronic device to send the configuration request to register with the network node to enable charging for the D2D communication between the first electronic device and the second electronic device. At step 1004, the method 1000 includes receiving the charging criteria including the charging metric along with its lifetime from the network node. In an embodiment, the charging criteria includes the charging metric corresponds to the predefined amount of time that the first electronic device communicates with the second electronic device during the D2D communication session. In another embodiment, the charging criteria includes the charging metric corresponds to the predefined amount of data to be transferred between the first electronic device and the second electronic device during the D2D communication session. In an embodiment, the method 1000 allows the UICC module 202 of the first electronic device to receive the charging criteria including the charging metric along with its lifetime from the network node. At step 1006, the method 1000 includes storing the charging criteria including the charging metric along with its lifetime. In an embodiment, the method 1000 allows the UICC module 202 to store the charging criteria including the charging metric along with its lifetime. At step 1008, the method 1000 includes receiving by the first electronic device the charging metric corresponds to a predefined amount of data transferred between the first electronic device and the second electronic device during the D2D communication session. In an embodiment, the method 1000 allows the controller module 206 of the first electronic device to receive the charging metric corresponds to a predefined amount of data transferred between the first electronic device and the second electronic device during the D2D communication session from the UICC module 202.

At step 1010, the method 1000 includes counting amount of data transferred between the first electronic device and the second electronic device during the D2D communication session. In an embodiment, the method 1000 allows the recording module 204 of the first electronic device to count the amount of data transferred between the first electronic device and the second electronic device during the D2D communication session. At step 1012, the method 1000 includes determining whether the amount of data meets the charging metric to trigger reporting of the charging information to the network node. In an embodiment, the method 1000 allows the controlling module 206 of the first electronic device to determine whether the amount of data meets the charging metric to trigger reporting of the charging information to the network node. If it is determined at step 1014 that the amount of data meets the charging metric then at step 1016, the method 1000 includes reporting the charging information to the network node in the wireless network. In an embodiment, the method 1000 allows the reporting module 208 to report the charging information to the network node in the wireless network. For example, the electronic device 102 reports the amount of data that is sent and received to the network node "A", whenever the communication is established with the network node "A". After registration with the Network node "A" (during NAS signaling i.e., attach or tracking area update or AS signaling) or using a new signaling messages, the electronic device 102 sends the charging usage report. However, this approach does not allow the (pre-) authorization of using the network resources based on the credit limits, and so on. If the direct communication is being used by the electronic device 102 in the coverage area of the network node "A", then the network node "A" monitors the transmission of the charging information (i.e., amount of volume) from the electronic device 102 for accounting. Based on the charging record, the network node "A" configures the electronic device for direct communication service based on the credits. In another example, the electronic device 102 counts its own usage and the usage of the communication device (i.e., electronic device 104). It is also possible for the one or more operators to reconcile the information in order to detect fraud. If it is determined at step 1014 that the amount of data does not meet the charging metric then at step 1010, the method 900 includes counting the amount of data transferred between the first electronic device and the second electronic device during the D2D communication session. In an embodiment, the method 1000 allows the recording module 204 to count the amount of data transferred between the first electronic device and the second electronic device during the D2D communication session. At step 1018, the method 1000 includes refreshing the charging metric for further D2D communication between the first electronic device and the second electronic device during the D2D communication session. In an embodiment, the method 1000 allows the UICC module 202 to refresh the charging metric for further D2D communication between the first electronic device and the second electronic device during the D2D communication session. After refreshing the charging metric, at step 1008 the method 1000 includes receiving by the first electronic device the charging metric corresponds to a new predefined amount of data transferred between the first electronic device and the second electronic device during the D2D communication session. In an embodiment, the method 1000 allows the controller module 206 to receive the charging metric corresponds to the new predefined amount of data transferred between the first electronic device and the second electronic device during the D2D communication session.

The various actions, acts, blocks, steps, and the like in method 1000 may be performed in the order presented, in a different order or simultaneously. Further, in some embodiments, some actions, acts, blocks, steps, and the like may be omitted, added, modified, skipped, and the like without departing from the scope of the invention.

Figure 11:
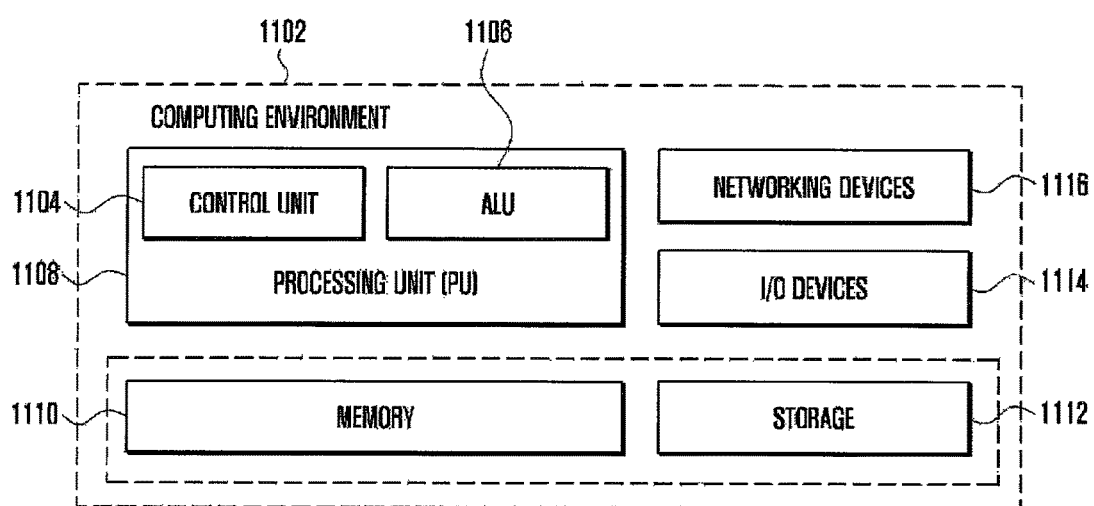
FIG. 11 illustrates a computing environment implementing the method and system of reporting charging information for the D2D communication, according to embodiments as disclosed herein.

FIG. 11 illustrates a computing environment implementing the method and system of reporting charging information for a Device-to-Device (D2D) communication, according to embodiments as disclosed herein. As depicted in the figure, the computing environment 1102 comprises at least one processing unit 1108 that is equipped with a control unit 1104 and an Arithmetic Logic Unit (ALU) 1106, a memory 1110, a storage unit 1112, plurality of networking devices 1116 and a plurality Input output (I/O) devices 1114. The processing unit 1108 is responsible for processing the instructions of the algorithm. The processing unit 1108 receives commands from the control unit in order to perform its processing. Further, any logical and arithmetic operations involved in the execution of the instructions are computed with the help of the ALU 1106.

The overall computing environment 1102 can be composed of multiple homogeneous and/or heterogeneous cores, multiple CPUs of different kinds, special media and other accelerators. The processing unit 1108 is responsible for processing the instructions of the algorithm. Further, the plurality of processing units 1108 may be located on a single chip or over multiple chips.

The algorithm comprising of instructions and codes required for the implementation are stored in either the memory unit 1110 or the storage 1112 or both. At the time of execution, the instructions may be fetched from the corresponding memory 1110 and/or storage 1112, and executed by the processing unit 1108.

In case of any hardware implementations various networking devices 1116 or external I/O devices 1114 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1a, 1b, 2, 3a, 3b, 4, 6, 7, 8 and 11 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for reporting information by a first terminal in a communication system, the method comprising:
performing a device to device (D2D) communication with at least one second terminal when the at least one second terminal and the first terminal are out of coverage of any network node;
recording usage information according to the communication;
generating at least one usage information report from the recorded usage information based on a predetermined period;
identifying whether the first terminal returns to a coverage for a network node of the any network node; and
transmitting the generated at least one usage information report, when the first terminal returns to the coverage of the network node.

2. The method of claim 1, wherein the at least one usage information report includes a duration of the communication between the first terminal and a at least one second terminal in a configured period.

3. The method of claim 1, wherein the at least one usage information report includes an amount of data transmitted and received in a configured period.

4. The method of claim 1, wherein the at least one usage information report is stored in a secure environment.

5. A method for reporting information by a first terminal in a communication system, the method comprising:
receiving, from a network, a reporting criterion including information associated with an amount of resource for performing a device to device (D2D) communication between the first terminal and at least one second terminal;
generating a report of usage information, when the first terminal communicates with the at least one second terminal in coverage; and
transmitting the report of the usage information, when a reporting criterion is met,
wherein the information is used to communicate with the at least one second terminal within the amount of resource.

6. The method of claim 5, further comprising determining that the reporting criterion is met if a configured period elapses.

7. The method of claim 6, wherein the report of the usage information includes at least one of a duration of the communication or an amount of data transmitted and received in the configured period.

8. The method of claim 5, wherein the report of the usage information is stored in a secure environment.

9. A first terminal for reporting information in a communication system, the first terminal comprising:
a transceiver configured to transmit and receive a signal; and
a controller configured to:
perform a device to device (D2D) communication with at least one second terminal, when the first terminal and the at least one second terminal are out of coverage of any network node;
recording usage information according to the communication;
generate at least one usage information report from the recorded usage information based on a predetermined period;
identify whether the first terminal returns to a coverage of a network node of the any network node; and
transmit the generated at least one usage information report, when the first terminal returns to the coverage of the network node.

10. The first terminal of claim 9, wherein the at least one usage information report includes a duration of the communication between the first terminal and the at least one second terminal in a configured period.

11. The first terminal of claim 9, wherein the at least one usage information report includes an amount of data transmitted and received in a configured period.

12. The first terminal of claim 9, wherein the at least one usage information report is stored in a secure environment.

13. A first terminal for reporting information in a communication system, the first terminal comprising:
a transceiver configured to transmit and receive a signal; and
a controller configured to:
receive, by the transceiver, from a network, a reporting criterion including information associated with an amount of resource for performing a device to device (D2D) communication between the first terminal and at least one second terminal;
generate a report of usage information, when the first terminal communicates with the at least one second terminal in coverage; and
transmit, by the transceiver, the report of the usage information, when a reporting criterion is met,
wherein the information is used to communicate with the at least one second terminal within the amount of resource.

14. The first terminal of claim 13, wherein it is determined that the reporting criterion is met, if a configured period elapses.

15. The first terminal of claim 14, wherein the report of the usage information includes at least one of a duration of the communication or an amount of data transmitted and received in the configured period.

16. The first terminal of claim 13, wherein the report of the usage information is stored in a secure environment.

* * * * *